Patented Sept. 29, 1942

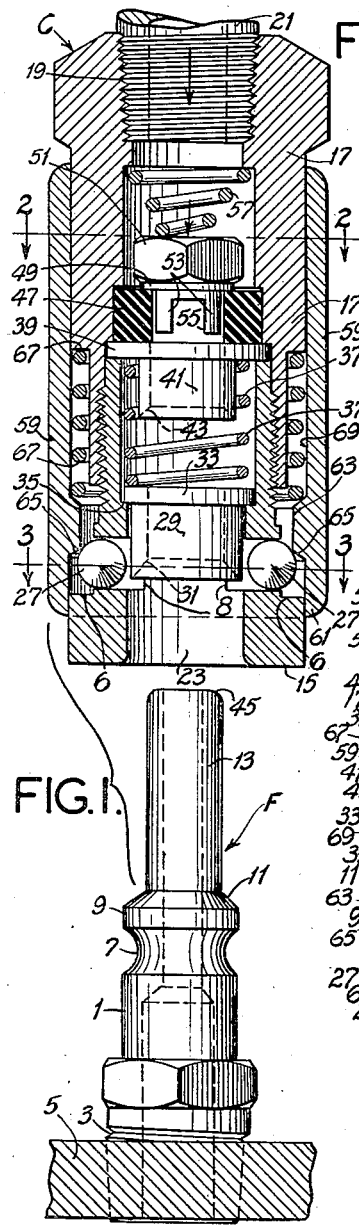
Sept. 29, 1942. A. P. FOX ET AL 2,297,548
COUPLER
Filed Sept. 22, 1941
Alexander P. Fox,
Rudy F. Schneller
Inventors.
Haynes and Koenig
Attorneys.

2,297,548

UNITED STATES PATENT OFFICE

2,297,548

COUPLER

Alexander P. Fox, University City, and Rudy F. Schneller, St. Louis, Mo., assignors to Lincoln Engineering Company, St. Louis, Mo., a corporation of Missouri Application September 22, 1941, Serial No. 411,842

2 Claims. (Cl. 285—169)

This invention relates to couplers, and with regard to certain more specific features to couplers for fluid conduits.

The invention is an improvement upon that disclosed in the United States Patent 2,279,146 of Rudy F. Schneller (one of the applicants herein), dated April 7, 1942, for Coupler.

Among the several objects of the invention may be noted the provision of a simple and reliable coupler for making a fastening between an air or like conduit with a fitting; the provision of a coupler of this class which may be applied and removed with a high degree of facility by natural movements; the provision of a coupler of the class described in which fluid flow is automatically cut off upon detachment but which is started automatically upon attachment; the provision of a coupler of the class described in which is a low degree of resistance to flow after attachment; and the provision of a coupler of the class described which has very strong holding means, which assures a secure connection. Other objects will be in part obvious and in part pointed out hereinafter.

The invention accordingly comprises the elements and combinations of elements, features of construction, and arrangement of parts which will be exemplified in the structures hereinafter described, and the scope of the application of which will be indicated in the following claims.

In the accompanying drawing, in which is illustrated one of various possible embodiments of the invention, Fig. 1 is a vertical section of the coupler shown separated from a fitting;

Fig. 2 is a horizontal section taken on line 2—2 of Fig. 1;

Fig. 3 is a horizontal section taken on line 3—3 of Fig. 1;

Fig. 4 is a view similar to Fig. 1 showing the coupling during application to the fitting;

Fig. 5 is a view similar to Fig. 4 showing completion of the attachment; and,

Fig. 6 is a horizontal section taken on line 6—6 of Fig. 5.

Similar reference characters indicate corresponding parts throughout the several views of the drawing.

Although the primary features of the present invention are more particularly for new holding means different from the balls indicated in said prior patent, it is deemed to be desirable to describe herein the other cooperating parts of the coupler. This is for the sake of completeness of description.

Referring now more particularly to Fig. 1, there is shown at numeral 1 the body of a nipple or fitting F for receiving fluid, which in this case is air. This fitting F is threaded at 3 for fastening to an air-receiving compartment 5. The fitting is provided with a groove 7 which is behind a shoulder 9. Above the shoulder 9 is a beveled portion 11 connecting with a cylindric sleeve 13.

Above the fitting F is shown the coupling C which consists of a guide sleeve 15 threaded onto a hollow body 17. The body 17 is threaded at 19 to provide for attachment to part of the line 21 which is to be coupled.

At the lower end of the guide sleeve 15 is an opening 23 which slidingly fits the portions 1 and 9 of the fitting F. Milled horizontally across the sleeve 15 are slots 25 for clutch pins or rollers or cylinders 27. The cylinders 27 are of a radius to fit the radius of the groove 7 when moved laterally inward. The cylinders 27 have reduced or pointed ends, as indicated at 4. The reductions are shown in the forms of cones but may also be rounded or the like.

The cylinders 27 are prevented from moving inwardly from the position shown in Fig. 1 by a holding sleeve 29 which slides down into the opening 23 a distance to block inward movement of the cylinders. This sleeve has a chamfered lower edge 31 for engagement with the beveled portion 11 upon application to the fitting F. At its upper end the sleeve 29 is provided with a flange 33 which rests upon a shoulder 35 to limit downward movement. A compression spring 37 biases the sleeve 29 downward for engagement between the flange 33 and the shoulder 35 when the coupling C is disconnected (Fig. 1). The compression spring 37 reacts against a flange 39 of a fixed guide sleeve 41 which also is chamfered at its bottom end, as indicated at 43, so that it also may be guided into place over the cylindric portion 13. The upper edge portion 13 of fitting F is rounded at 45 to provide a smooth engagement with 31 and 43.

The sleeve 41 is stationary, being held in the body 17 by the threaded sleeve 15. The flange 39 holds in position a packing 47 which, during assembly, is lightly compressed endwise, so that it radially hugs the portion 13 of the fitting F when applied. This forms a leak-proof seal.

The packing 47 also forms a seat for a rim seat 49 of a hexagonal valve 51. The seat 49 is round to form a complete seal when seated, while the upper portion of the valve is made hexagonal to pass air.

Extending from the lower portion of the valve 51 is a pair of extensions 53 for contacting the end of the fitting F. These will pass air between them at 55 when the valve is open. The valve is normally held to its seat on the packing 47 by means of a compression spring 57. Thus when the coupling C is detached, the valve is normally closed by the spring 57 and in addition by pressure behind it (Fig. 1).

Around the body 17 is a sliding outer sleeve 59, having a guide portion 61 sliding on the lower end of the sleeve 15. This outer sleeve 59 is provided with an inward shoulder 63 which is chamfered as indicated at 65. The chamfered portion 65 and the shoulder 63 function as a cam which engages the chamfered or pointed end 4 of the cylinder 27, for enforcing inward movement of these cylinders under appropriate conditions. The sleeve is movable back into a position where the chamfer 65 is above the cylinders 27. When the cylinders 27 are prevented from moving inwardly by the sleeve 29, they hold up the sleeve 59 by interlocking action at the chamfer 65. The sleeve 59 is biased downward by means of a compression spring 67 positioned in a space 69 in the body 17 and reacting at the upper end against body 17. In the lower position of sleeve 59, the chamfer 65 rests upon flange 6.

Operation is as follows, referring first to Fig. 1:

The valve 51 is shut by reason of the biasing action of the spring 57 and the pressure of the fluid behind it. It forms a seal on the relatively soft seat of the packing 47, which may be made of artificial rubber, for example. The coupling C at this time is grasped around the outer sleeve 59 (which is knurled) and simply pushed toward the fitting F. This is a natural movement for the purpose.

As shown in Fig. 4, the inner locking sleeve 29 slides down the cylindric portion 13 of the fitting F, and its chamfer 31 finally contacts the beveled portion 11, whereupon the sleeve is relatively pushed back against bias of the spring 37. This releases the cylinders 27 for inward motion under the action of the bevel 65 on the shoulder 63. The sleeve 59 is under bias of the spring 67, and after the parts have attained the relationship shown in Fig. 4, action thereafter is automatic under bias from spring 67. Thus the sleeve 59 moves from the Fig. 4 to the Fig. 5 position without additional manual push. This automatically locks the cylinders 27 into the groove 7, so that pressure reaction will not blow apart the coupling and the fitting (Fig. 6).

It will be seen that during the locking action the parts 65 and 63 function as cams at four points 18 on the cylinders 27, that is at the pointed portions 4. Thus there are two pressure points on each cylinder 27, which effect a substantial beam action at the center of each cylinder where it contacts the fitting F. Stated otherwise, each cylinder acts as a beam which springs tightly into a tangent holding position, as shown in Fig. 6. This is one of the advantages of the cylinders over the balls shown in the prior patent. While this advantage sacrifices the advantage that accrues to a ball in its ability very easily to roll around the groove (for swivelling), this sacrifice is deemed to be desirable. What is more important is to obtain a tight and strong hold. In the present case, this hold is enhanced by wedging action between the points 4 and the portions 63 and 65, which makes each pin 27 a centrally loaded beam, as can be visualized from Figs. 5 and 6.

Another advantage of the cylinders over the former balls is that the accommodating milled slots 25 are much easier to make than the drilled portions of the former patent. This is because these drilled portions included a rather critically positioned shoulder; whereas in the present case inner surfaces 8 of the slots 25 are inherent in forming the slots.

Another advantage of the invention is that for a given, relatively low number of gripping points on the fitting, a larger number of contact points is afforded within the sleeve 59. This applies spreading force evenly within the sleeve. In the case of the balls, in order to get the same distribution, four balls would need to be used in the groove 7. Any number of balls greater than three used in this way brings about a redundancy of one ball, which quite often results in that ball being inactive due to inaccuracies of the circular forms of the members between which the balls are located. With the present invention, the four points of contact between the ends of the rollers within the sleeve 59 and the two points of contact between the central portions of the rollers and the groove 7 become automatically adjusted through the beam action through the rollers. Thus, even with four points of force application to the sleeve, no mechanical redundancy occurs.

During the movement illustrated in Fig. 4, the guide sleeve 41 also comes into position over the cylindric portion 13, and guides the packing 47 into sealing position around the end of the fitting. At the same time, the extensions 53 are contacted to open the valve 51 against the bias of the spring 57 and against the bias of the pressure of the fluid behind the valve. Flow through the coupling is therefore released as indicated by arrows in Fig. 5.

Release is quite easily effected simply by pulling upon the sleeve 59. This withdraws the shoulder 63 into the position shown in Fig. 4 to release the cylinders 27 from the groove 7. Pulling results in lifting the sleeve 15. This lifts the cylinder clear of the shoulder 9 on the fitting F and they become trapped behind locking sleeve 29. At the same time, as the packing 47 is withdrawn from the end of the cylindric portion 13, the valve 51 automatically shuts against outflow of fluid.

With the present coupler, the sleeve 59 is simply pressed down with the same pressure that applied the coupling, and as soon as the locking sleeve 29 releases the cylinders 27, the spring 67 automatically pushes down the sleeve 59 with a snap, helping the operators hand to lock in the cylinders. The snap-action is also a signal that coupling has been completed. To conceive more effectively of the advantage in this respect, it may be noted that if the fitting is pressed into the coupler while holding the coupler stationary, without touching the sleeve 59, the action is to push back the locking sleeve 29 whereupon the spring 67 automatically, without even being touched, moves toward the fitting to push the cylinders 27 into locking position. This fact of the automatic action of the sleeve 59 in the direction in which it is being manually pushed, provides a very desirable operating feature. It will be understood however, that the invention also has advantages without the spring 67.

Furthermore, upon pulling the coupler away from the fitting, the manual pull is naturally in the direction for moving the sleeve 59 against the bias of spring 67. Thus, the action needed anyway for withdrawing the coupling from the fitting is the same one used to unlock the cylinders 27. Then as the coupler is withdrawn, the locking sleeve 29 automatically moves into position to hold the cylinders 27 where they will hold the sleeve 59 in retracted position until the next application. Furthermore, the sleeve 29 prevents the cylinders 27 from falling out into the central opening 23.

The member 15 may be considered to be an extension from the body 17, being permanently threaded thereon.

The simplicity of the construction is apparent from the drawing and it may be carried out in reliable forms at low cost.

It is to be understood that the cylinders or pins 27 need not be axially straight, and may, for example, be barrel shaped or shaped like an hourglass, these being substantial equivalents for the purpose of obtaining the endwise camming contact between the points 4 and the parts 65 and 63.

From the above it will be seen that in general the cylinders or rollers 27 provide a much more rugged and strong locking means than the swivelling balls heretofore used in said former application.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. In a coupler having a cylinder for receiving a fitting having a groove, said coupler having independently biased and movable sleeves inside and outside respectively, opposite slots in the cylinder located in a plane normal to the axis of the cylinder, rollers having axes respectively in the planes of the slots and movable laterally and being oppositely and tangentially engageable at their central portions within said groove, spaced reduced portions on the ends of the rollers, and circular cam means carried within the outer independently movable sleeve engaging the spaced reduced portions of said rollers to force them inward when cleared by the inner sleeve, whereby the rollers rest centrally in said groove and are pressed at their ends to form the equivalents of centrally loaded oppositely reacting beams in their gripping actions upon the fitting.

2. In a coupler having a cylinder for receiving a grooved fitting and having independently biased and moving sleevees inside and outside respectively, opposite slots in the cylinder located in a plane normal to the axis of the cylinder, rollers having axes respectively in the planes of the slots and movable laterally and being oppositely and tangentially engageable at their central portions with said grooves, spaced cam-contacting ends on the rollers, and circular cam means carried within the outer independently movable sleeve engaging the spaced cam-contacting means on each of said rollers to force them inward when cleared by the inner sleeve, whereby the rollers rest centrally in said groove and are pressed at their cam-contacting ends to form the equivalents of centrally loaded oppositely reacting beams in their gripping action upon the fitting.

ALEXANDER P. FOX.
RUDY F. SCHNELLER.